3,163,283
CONVEYORS
Erich Kuwertz, Kaiserslautern, Pfalz, Germany, assignor to G. M. Pfaff Aktiengesellschaft, Kaiserslautern, Pfalz, Germany, a German company
Filed Feb. 18, 1963, Ser. No. 259,792
Claims priority, application Germany, Feb. 19, 1962, P 28,821
4 Claims. (Cl. 198—38)

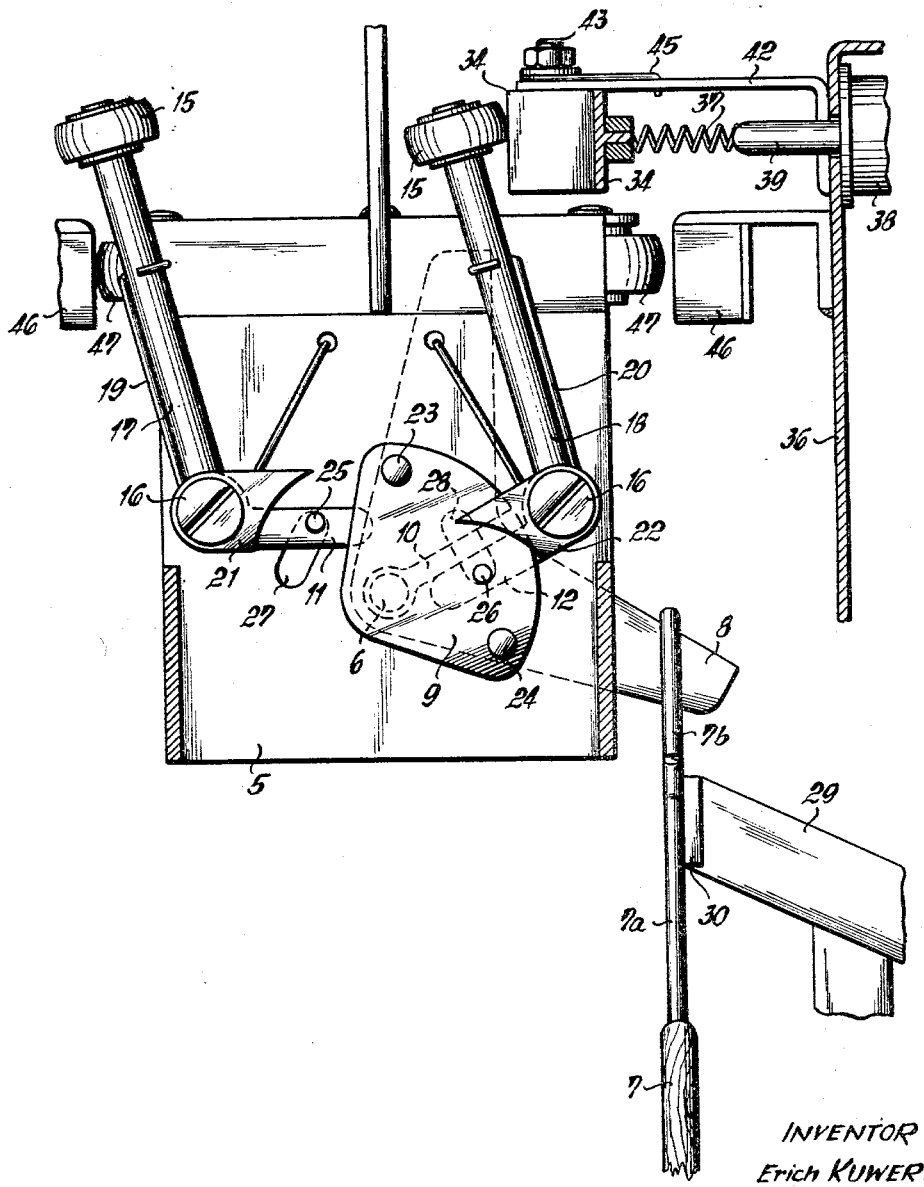

The present invention relates to conveyors for carriers of work pieces or material which are provided with a hook-shaped suspension member, are accepted by a support member and automatically delivered to receiving bars or rods at pre-selectable dropping or delivery points.

The object of the present invention is to provide a conveyor having supporting members for delivering several work carriers on both sides of the conveyor, in such manner as to ensure reliable transference of the work carriers without accurate relative alignment of the supporting member and the receiving rod or bar.

This is achieved, in accordance with the present invention, by means of a supporting member of V-shape which is connected to a spindle provided in the longitudinal plane of symmetry of the conveyor and is pivotally displaced into the delivery position, and by stationary work carrier shunt rails which co-operate with the supporting member at the respective delivery stations within its range of pivotal displacement and extend parallel to the direction of feed by the conveyor.

Further, by the present invention a construction is used in which the guide rail is formed by an end of the receiving bar or rod which is bent at a right angle. Due to the direct connection of the guide rail and receiving bar or rod it is impossible for the work carrier to miss the receiving rod during the transfer operation, since the carrier engages over the receiving bar or rod before sliding from the supporting member.

The present invention is more particularly described with reference to the accompanying drawings which illustrate one embodiment of the conveyor by way of example and in which:

FIGURE 4 is a cross section taken on the line III—III of FIGURE 3, the supporting member being shown in its dropping position.

Figure 1:
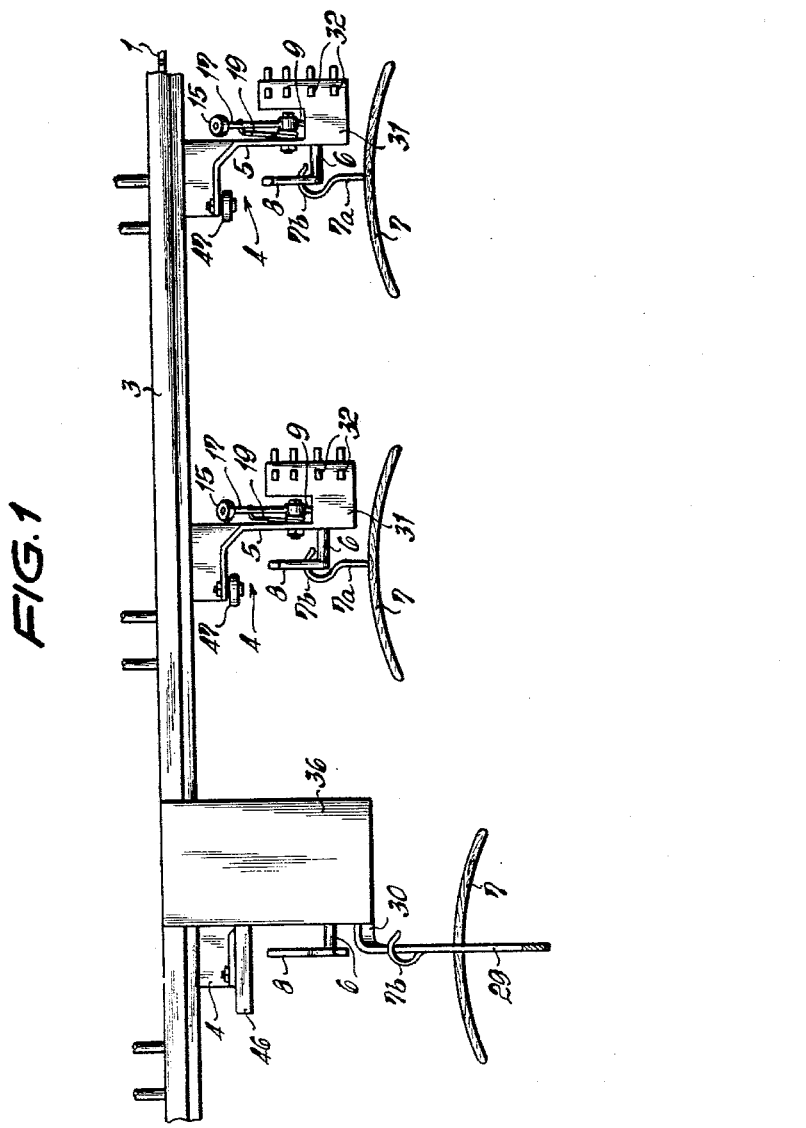
FIGURE 1 is an overall schematic view of the conveyor device.
Figure 2:
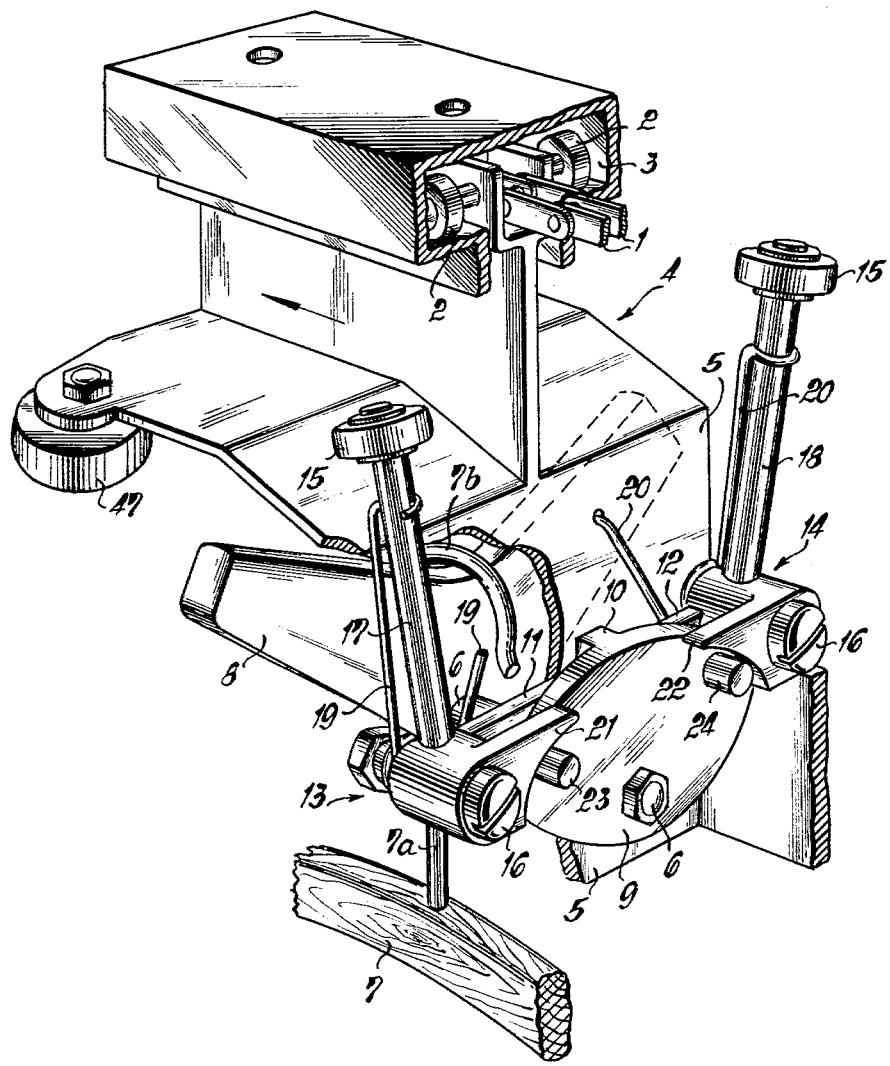
FIGURE 2 is a perspective view on an enlarged scale of a conveyor member of the device.

The conveyor element in the form of a chain 1 shown in FIG. 1 is provided at predetermined spaced intervals with rollers 2 which run on supporting means such as a guide track 3 formed of profile rails and in turn is secured to a frame or other support such as the ceiling of a room. Linked to each pair of opposed rollers 2 is a carriage or conveyor member 4 which is displaceable along the conveyor track. The conveyor member 4 has a front wall 5 in which a spindle 6 is journalled to rotate in the longitudinal plane of symmetry of the conveyor. At its front end, the spindle 6 carries a V-shaped supporting member 8 presenting two arms freely extending in opposite directions and serving to receive a hook-shaped suspension member 7a of a work carrier 7. Member 8 is supported by spindle 6 at its center intermediate its two arms and pivotally movable in two opposite directions. Furthermore a control disc 9 is connected to the spindle 6, which is provided with a rib 10 adapted to determine the center position of the supporting member 8 (see also FIG. 3), this rib being contacted by two oppositely disposed arms 11, 12, of control levers 13, 14 respectively. The control levers 13, 14, are journalled to rotate on trunnion screws or bolts 16 mounted in the front wall 5 and have control rods 17, 18 respectively on the upper end of each of which a roller 15 is rotatably journalled.

Two torsion springs 19, 20 encompassing the trunnion screws 16 are connected at one end to the front wall 5 of the conveyor member 4 and have their other end disposed around the control rods 17 and 18 respectively, so that they are normally held in an upward and outwardly directed position.

In order to transmit pivotal movements of the control rods 17, 18 initiated by release means to be described hereinafter, from the control rods 17, 18 to the control disc 9, the control levers 13, 14 are provided with drivers 21, 22 in whose path are respectively located two pins 23, 24 mounted on the control disc 9. The arms 11, 12 of the levers 13, 14 have abutment pins 25 and 26 respectively (FIG. 3) which slide in slots 27 and 28 respectively provided on the front wall 5 and limit the range of swing of the control rods 17, 18.

Provided at each of the delivery or dropping points arranged on the conveyor installation is a receiving bar or rod 29 (FIGS. 3 and 4) which serves to receive the work carriers 7, is inclined downwardly and outwardly and the upper end of which is provided with a guide rail 30 co-operating with a support member 8 during the transfer of the work carriers 7. The guide rail 30 extends within the pivotal range of the support members 8 and extends in the direction of feed, i.e., parallel or substantially parallel to the track 3.

The conveyor members 4 are provided with a conventional selector device 31, the contact members 32 of which co-operate with electric switches 33 arranged at the delivery stations. At each delivery point there is provided a release lever 34 which co-operates with the rollers 15, is journalled by means of a pin 35 to rotate on a supporting plate 36 and is held by a spring 37 in the normal position shown in chain dotted lines in FIG. 3.

Figure 3:
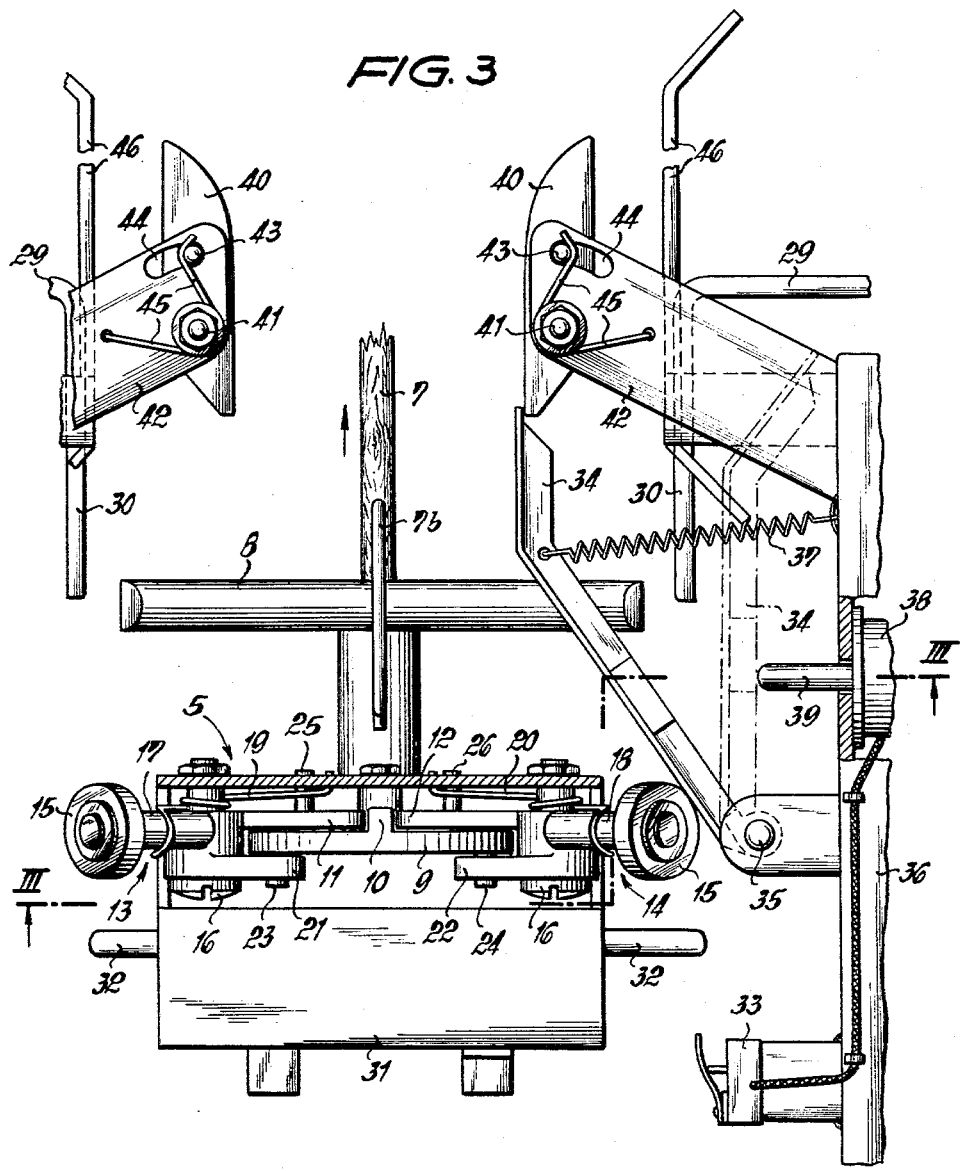
FIGURE 3 is a plan view of a dropping point at the beginning of the transfer operation.

In order to initiate a lateral pivotal movement of a support member 8 about its shaft 6 which is necessary for transferring the appropriate work carrier 7 from the conveyor, the release lever 34 under the control of an electromagnet 38 provided at the delivery point, is brought into the position illustrated in FIG. 3 in full lines, and held therein by means of a locking lever 40.

The locking lever 40 is journalled to rotate on a supporting arm 42 about a bolt 41 and, for limiting its rotary movement, has an abutment pin 43 which slides in a slot 44 of said arm 42. A torsion spring 45 enclosing the bolt 41 is held at one end in the supporting arm 42 and at its other end in contact with the abutment pin 43 so that the locking lever 40 is normally held in the position shown in FIG. 3. In order to avoid lateral oscillation of the conveyor member 4 during the swinging movement of the supporting member 8, the delivery points are provided with guide rails 46 which act as stops for guide rollers 47 journalled at the sides of a conveyor member 4.

The mode of operation of the conveyor is as follows.

A work carrier is hooked on the supporting member 8 of a conveyor member 4 at a central delivery or operating point. Then the end station is identified in known manner by pressing in the appropriately marked key on the selector 31. When the mark set on the selector 31 agrees with the mark or sign of the delivery or dropping point, the contact member 32 actuates the switch 33, so that the electro-magnet 38 receives a current pulse. The push rod 39 of the electro-magnet 38 thereby urges the release lever 34 into the position shown in full lines in FIG. 3 against the action of the spring 37. The release lever 34 is retained therein by the locking lever 40.

When the roller 15 of a control lever 14 runs on the release lever 34 of the delivery station, a pivotal movement is transmitted to the supporting member 8 by means of the driver or pawl 22 and the control disc 9. Thus the supporting member moves into a position inclined towards the delivery point so that the work carrier 7 slides downwardly under the action of gravity on the inclined side of the supporting member 8 where it abuts against the guide rail 30 (see FIG. 4). In this position the work carrier 7 is moved further along the guide rail 30 in the feed direction until the vertical portion 7a of its hook 7b reaches the receiving bar or rod 29.

As soon as the vertical part 7a has passed the receiving bar or rod 29, the work carrier 7 continues to slide downwardly on the support member 8 and drops vertically. The hook-shaped end 7b of the work carrier 7 engages around the receiving bar or rod 29 before it slides off the support member 8 and is thus received thereby as it drops. Since the hook-shaped end 7b of the work carrier 7 is necessarily above the receiving bar or rod 29 before it drops off the supporting member 8, it cannot miss said rod.

The transference of the work carrier is effected in a transfer area defined by the length of the guide rail, with the result that it is quite independent of the speed of the conveyor. Since the transfer of a work carrier takes only a comparatively short time, several work carriers may be simultaneously deposited at a delivery or dropping position or station.

After the conveyor member 4 has passed the delivery position, the roller 15 comes into contact with the arcuate portion of the locking lever 40. Due to the expanding torsion spring 20, the locking lever is turned in a clockwise direction (FIG. 3), whereby the lever 34 is released and is brought by the spring 37 into its position shown in chain dotted lines in FIG. 3. The support member 8, the locking lever 40 and the release lever 34 thus resume their initial position so that succeeding conveyor members, which are intended to be transferred at another delivery station, can pass by unimpeded.

In the foregoing, the invention has been described with reference to diagrammatically illustrated yet specific devices. It will be evident, however, that variations and modifications, as well as the substitution of equivalent parts and devices for those shown herein for illustration, may be made in accordance with the broader scope and spirit of the invention, as set forth in the appended claims. The specification and drawings are accordingly to be regarded in an illustrative rather than in a restrictive sense.

I claim:

1. A conveyor system for work carriers having a suspension member, said conveyor system comprising a conveyor element, means for movably supporting said element, carriages supported on said conveyor element, and a plurality of delivery stations, each having a stationary guide rail and a receiving bar for said carriers disposed at predetermined positions along said conveyor element, each of said carriages having a V-shaped supporting member presenting two freely extending arms, a spindle extending longitudinally of the plane of symmetry of said conveyor element and supporting said V-shaped member at the center thereof intermediate said arms for pivotal movement at a predetermined delivery station in the direction of said delivery station, said stationary guide rails being disposed optionally on either side of said conveyor within the range of pivotal swing of said supporting members and extending parallel to the path of said conveyor.

2. A conveyor system for work carriers having a suspension member, said conveyor system comprising a conveyor element, means for movably supporting said element, carriages supported on said conveyor element, and a plurality of delivery stations, each having a stationary guide rail and a receiving bar for said carriers disposed at predetermined positions along said conveyor element, each of said carriages having a V-shaped supporting member presenting two freely extending arms, a spindle extending longitudinally of the plane of symmetry of said conveyor element and supporting said V-shaped member at the center thereof intermediate said arms for pivotal movement at a predetermined delivery station in the direction of said delivery station, said stationary guide rails being disposed optionally on either side of said conveyor within the range of pivotal swing of said supporting members and extending parallel to the path of said conveyor and having one end proximate an end of one said receiving bar and being bent at a right angle relative thereto.

3. A conveyor system for work carriers having a suspension member, said conveyor system comprising a conveyor element, means for movably supporting said element, carriages supported on said conveyor element, and a plurality of delivery stations, each having a stationary guide rail and a receiving bar for said carriers disposed at predetermined positions along said conveyor element, each of said carriages having a V-shaped supporting member, a spindle extending longitudinally of the plane of symmetry of said conveyor element and supporting said V-shaped member for pivotal movement at a predetermined delivery station, said stationary guide rails being disposed within the range of pivotal swing of said supporting members and extending parallel to the path of said conveyor and having one end proximate an end of one said receiving bar and being bent at a right angle relative thereto, said system including control means for pivotal displacement of said supporting members including a front wall on said carriage pivotally supporting said spindle, a control disk mounted on said spindle of each said carriage and having a pair of pins projecting from one side thereof and a web projecting from the other side thereof, a pair of control levers mounted on said front wall on opposite sides of said spindle, each having a pawl at its lower end in engagement with one of said pins and each having an arm at said lower end in sliding engagement with said web, and said front wall pivotally supporting said spindle and presenting two guide slots, one for each said control lever, and each said arm having a pin extending into one of said guide slots.

4. A conveyor system in accordance with claim 3 including spring biasing means for said levers comprising a spring having one end in engagement with said front wall and another end in engagement with said lever.

References Cited by the Examiner

UNITED STATES PATENTS

| | | | |
|---|---|---|---|
| 1,778,484 | 10/30 | Da Costa | 198—38 |
| 2,013,141 | 9/35 | Frost | 198—38 |
| 2,993,584 | 7/61 | Winz | 198—38 |

SAMUEL F. COLEMAN, *Acting Primary Examiner.*
ERNEST A. FALLER, JR., *Examiner.*